United States Patent [19]
Matsuda et al.

[11] Patent Number: 5,127,361
[45] Date of Patent: Jul. 7, 1992

[54] RESIN COATING DEVICE FOR OPTICAL FIBER

[75] Inventors: Yasuo Matsuda; Kohei Kobayashi, both of Kanagawa, Japan

[73] Assignee: Sumitomo Electric Industries, Ltd., Osaka, Japan

[21] Appl. No.: 759,430

[22] Filed: Sep. 13, 1991

[30] Foreign Application Priority Data

Sep. 17, 1990 [JP]   Japan ................... 2-246469

[51] Int. Cl.$^5$ ..................... C03C 25/02; B05C 3/15
[52] U.S. Cl. ..................... 118/405; 65/3.11; 65/3.43; 65/3.44; 65/11.1; 118/420; 118/429; 427/163
[58] Field of Search ............ 65/3.11, 3.43, 3.44, 65/11.1; 118/405, 420, 429; 427/163

[56] References Cited

U.S. PATENT DOCUMENTS

| | | | |
|---|---|---|---|
| 4,144,838 | 3/1979 | Ichiyanagi et al. | 427/163 |
| 4,264,649 | 4/1981 | Claypoole et al. | 427/163 |
| 4,409,263 | 10/1983 | Aloisio et al. | 118/405 X |
| 4,531,959 | 7/1985 | Kar et al. | 65/3.11 |
| 4,583,485 | 4/1986 | Smith | 118/405 X |
| 4,644,898 | 2/1987 | Jochem et al. | 118/405 |

Primary Examiner—Robert L. Lindsay
Attorney, Agent, or Firm—Cushman, Darby & Cushman

[57] ABSTRACT

An optical fiber resin coating device having a nipple and a die which each have gradually tapering holes through which the optical fiber is drawn. The die and the nipple have adjacent parallel flat surfaces which are spaced to created a gap through which resin is supplied by pressuring to be applied to the optical fiber. The gap between the die and the nipple and the tapered holes within the die and the nipple are all designed to produce a resin coating which is even and contains no air bubbles, especially at high optical fiber drawing rates.

4 Claims, 2 Drawing Sheets

RESIN COATING DEVICE FOR OPTICAL FIBER

BACKGROUND OF THE INVENTION

The present invention relates to a device for coating an optical fiber with a protective resin, and particularly relates to a device for evenly coating an optical fiber with resin which has a reduced number air bubbles and can be applied at a high drawing rate.

An optical fiber made of glass from the quartz group has been widely used as an optical fiber for communication transmission. Because the optical fiber is extremely weak when the fiber is flawed, the manufacturing process includes a step in which the fiber is covered with a protective resin just after the fiber is formed and before it can be damaged. An optical fiber is commonly coated with resin by a process as shown in FIG. 5. Optical fibers can be damaged by "micro-bending" or "macro-bending" depending on the severity of the external force. A damaged or bent optical fiber will result in increased transmission loss and a shorter useful life span.

As an example of the current optical fiber production processes, FIG. 5 shows a technique disclosed in U.S. Pat. No. 4,264,649 issued to Claypoole. Shown in FIG. 5 is a device used to apply a liquid resin onto the optical fiber, and the resin is later hardened by irradiation of ultraviolet rays or thermal heating. The optical fiber 1 is drawn through a nipple hole 11 and a nipple 2 and into a die 3. Contained in a gap between the corn like side surface 16 of the nipple 2 and the tapered side 13 of the die 3 is the resin 4 to be applied to the optical fiber 1. A meniscus 17 is formed as the optical fiber 1 is drawn through the pressure fed resin 4. The resin 4 is squeezed and shaped to the desired outer circumference as the optical fiber is drawn through the outlet hole 14. The entire apparatus is contained in a holder 5.

As the demand for optical fibers has grown, the optical fiber industry has enhanced its mass production techniques by increasing the drawing rate by which fibers are manufactured. However, with a device as shown in FIG. 5, at high drawing rates (i.e., over 500 m/min) air bubbles are mixed with the resin and the outer circumference of the optical fiber is not evenly coated with resin. Uneven resin coating can cause micro- or macro-bending in the fiber when an external force is applied or when the resin undergoes expansion or contraction as a result of temperature changes. Therefore, a device as shown in FIG. 5 has a limited drawing rate for acceptable fiber optic production.

Various innovations have been attempted in order to accomplish an evenly resin coated fiber at higher drawing rates. For example, as disclosed in Kar, U.S. Pat. No. 4,531,959, the resin is forced through a cylindrical body containing numerous holes positioned between a nipple and a die. The optical fiber is drawn through the center of the cylindrical body as it passes through the nipple and the die in an attempt to produce a bubble free and evenly resin coated optical fiber. Another innovation disclosed in Jochem, U.S. Pat. No. 4,644,898, purges the meniscus portion of the device with a low kinematic viscosity gas; furthermore, a central position of the resin coating device is mechanically adjustable. However, each of these techniques entails complicated devices which require fine adjustments for satisfactory optical fiber production. Therefore, they have proven to be difficult to easily use in mass production. The present invention solves both the air bubble and uneven coating problems while offering low maintenance equipment which can be operated at high drawing rates.

SUMMARY OF THE INVENTION

The present invention is an apparatus for applying a protective resin coating to optical fiber. The apparatus contains a nipple and a die, in which a meniscus where resin meets the optical fiber is formed. The diameter of the hole of the nipple and the gap between the nipple and the die are comparably small according to the present invention. In this configuration, the meniscus is kept small as shown in FIG. 6(A) in order to prevent air bubbles from mixing with the resin. The elements depicted in FIG. 6 are numbered just as they were in FIG. 5.

Conversely, if the nipple hole were larger, FIG. 6(B), or the gap between the die and the nipple were greater, FIG. 6(C), the meniscus becomes too large and its shape is unstable at the contact point between the resin and the optical fiber allowing air bubbles to mix with the resin.

Likewise, in order to prevent unwanted eddies from forming in the resin flow, the sectional area of the flow path in the resin flow direction is monotonically reduced. When the area between the nipple and the die is large and the drawing rate is high creating a high resin flow rate, the resin has a tendency to reverse its flow direction, thereby creating an eddy and introducing turbulent resin flow with air bubbles.

Therefore, the primary object of the present invention is to provide an optical fiber resin coating device which uniformly coats the fiber with bubble-free resin even at high drawing rates.

DETAILED DESCRIPTION OF THE INVENTION

Figure 1:
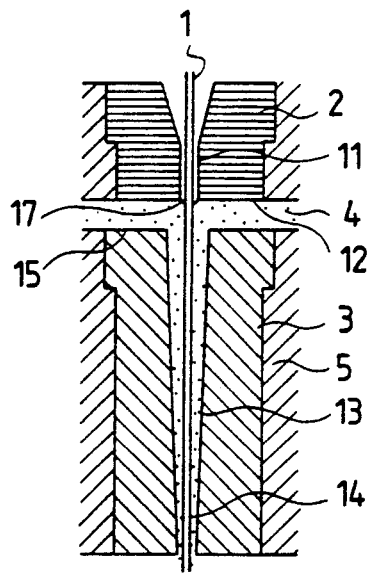
FIG. 1 is a sectional view of an embodiment of the resin coating device according to the present invention.

FIG. 1 is a sectional view of an embodiment of the resin coating device according to the present invention. The optical fiber 1 is drawn through a nipple hole 11, located in the center of the nipple 2, and into a die 3. Contained in a gap between the nipple 2 and the die 3 is the resin 4 to be applied to the optical fiber 1. The lower surface 12 of the nipple 2 is parallel to the upper surface of the die 15, and each surface is perpendicular to the central axis of the optical fiber 1 as it is drawn. A meniscus 17 is formed as the optical fiber 1 is drawn through the pressurized resin 4. The resin 4 is squeezed and shaped to the desired outer circumference as the optical fiber is drawn through the outlet hole 14 which is in the center of the die 3. The entire apparatus is contained in a holder 5.

Figure 4:
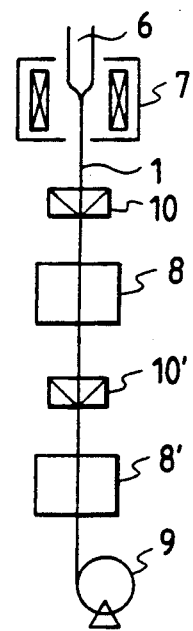
FIG. 4 is a schematic view of a standard process applicable to the present invention or the prior art for drawing an optical fiber and applying a resin coating onto the outer circumference of the fiber.

In order to put the resin coating device of the present invention in the proper optical fiber manufacturing context, FIG. 4 is a schematic of a typical process. The optical fiber 1 is formed from the optical fiber mother material 6 in a drawing furnace 7. As is typical in the industry, FIG. 4 shows two separate resin coating devices 10 and 10'; therefore, the optical fiber in this example will have two concentric layers of protective resin applied to it. After the resin is applied in each resin coating device, it is solidified in the resin hardening devices 8 and 8'. The winder 9 accumulates the optical fiber at the completion of the whole process.

Referring once again to FIG. 1, the optical fiber 1 is inserted through the hole 11 of the nipple 2 and wetted with the resin 4 in the meniscus 17. The resin 4 is fed into the tapered portion 13 of the die 3 through a gap between the nipple lower surface 12 and the die upper surface 15. The meniscus 17 is formed in the region where the optical fiber is initially contacted by the resin 4. The resin 4 adheres to the optical fiber 1 as it is drawn through the die 3. The resin 4 is finished by the outlet hole 14 of the die 3 to a predetermined diameter.

Figure 2:
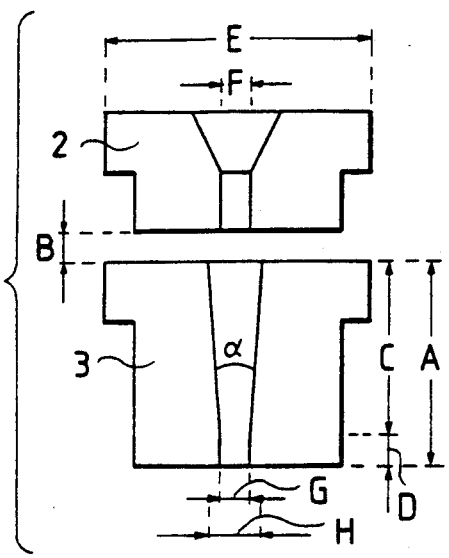
FIG. 2 is a view to clarify the dimensions of the nipple and the die.

FIG. 2 shows some of the more important dimensional relationships of this embodiment according to the present invention. The diameter of the nipple hole F is smaller than the diameter of the inlet of the die H, or $$F < H$$

as written in algebraic terms. In addition, the length of the gap between the nipple lower surface and the upper surface of the die, B in FIG. 2, is between one quarter and four times the inlet hole diameter H; in other words $$H/4 \leq B \leq 4H$$

However, in order to design an optimum resin application device with practical precision limitations, the relationship $$H/2 \leq B \leq 2H$$

is more preferred.

In order to prevent eddies in the resin flow according to the present invention, the sectional area of the flow path of the resin in the vicinity of the inlet of the die at the point where the resin flow changes direction to conform with the drawing direction of the optical fiber was designed to satisfy the condition $$\pi H^2/4 < \pi H B$$

where H is the diameter of the inlet hole of the die and B is the gap distance between the nipple and the die. Continued reference to FIG. 2 is helpful in understanding these relationships of the present invention. In that the condition $$ti\ \pi(H^2 - d^2)/4 < \pi H^2/4$$

is satisfied, then the condition $$\pi(H^2 - d^2)/4 < \pi H B$$

must likewise be satisfied where d is the outer diameter of the optical fiber. In this way, the cross-sectional area of the flow path is uniformly reduced at the point which the flow direction of the resin changes from substantially horizontal to substantially vertical in FIG. 1. Thereby, eddy formation is prevented.

Similarly, the length of the tapered portion of the die C in FIG. 2 must also be designed for the ultimate resin application. As the optical fiber is drawn through the nipple and the die, a self-centering force acts in the tapered portion of the die to always keep the fiber running in the center of the hole. A direct relationship exists between the length of this tapered portion and the magnitude of the self-centering force acting on the fiber; the longer the tapered portion the larger the force. Specifically, through experimentation it has been found that a tapered portion which is not shorter than approximately five times the diameter of the outlet hole is particularly effective in preventing uneven resin application. This relationship defines another preferred embodiment of the present invention and can be expressed as $$5G \leq C$$

where G is the die outlet hole diameter and C is the length of the tapered portion, FIG. 2.

However, there is a limit at which the magnitude of the self-centering force no longer improves the evenness of the resin coating. Furthermore, machine production costs for producing a die with an extremely long tapered portion become prohibitive. Therefore, a practical limit on the length of the tapered portion of the die is approximately 10 mm.

Furthermore, the outlet portion of the die hole D is designed to be not shorter than the diameter of the outlet hole:

$$G \leq D$$

In this way, a constant diameter hole, D in FIG. 2, between the end of the tapered portion and the die outlet hole further maximizes the stability of the resin flow even at high drawing rates. This relationship between G and D defines another preferred embodiment of the present invention.

The angle $\alpha$ in FIG. 2 of the tapered portion of the die hole is limited to between two and eight degrees, or $$2° \leq \alpha \leq 8°$$

Once again, as a result of experimentation it has been determined that the self-centering force is maximized when the taper angle $\alpha$ is approximately between 2° to 4°. An angle $\alpha$ less than 2° presents operational problems. Furthermore, this self-centering force becomes extremely small when $\alpha$ exceeds 8°. Therefore, for the resin application device of this preferred embodiment, the following relationship should be observed:

$$2° \leq \alpha \leq 4°$$

Consequently, the present invention is designed to maximize the self-centering force and minimize eddies with smooth resin flow. In this manner, the optical fiber always passes through the center of the die hole thereby applying an even thickness of bubble-free resin along the fiber's entire length.

The data shown in FIG. 8 is the result of experimentation and will be used to further describe in detail the embodiments of the present invention. The experiments were conducted by applying a single layer of resin from the urethane acrylate group to an optical fiber of 125 $\mu$m diameter at a drawing rate between 300 and 1200 m/minute. Generally, devices as described in FIG. 4 were used for the experiments.

As one output of the experimentation, a qualitative estimation was made on the resin coating as applied (i.e., the degree of evenly applied resin thickness, the degree of air bubbles mixed into the resin, etc.). The experimental results are depicted in Table I. In Table I the letters A thru H and α represent the same parameters as shown in FIG. 2 (in millimeters and degrees as appropriate). The following symbols indicate the maximum drawing rates in meters per minute (m/min) at which stable coating can be made in the experiments:

$$1000 \leq \theta$$

$$800 \leq \beta \leq 1000$$

$$500 \leq \P \leq 800$$

$$\Sigma \leq 500$$

Furthermore, the following symbols used in Table I have the indicated meaning

Φ≡ Portions of uneven resin thickness
Ω≡ Air bubbles contained in the resin

Resin coating devices Nos. 1-1, 1-2, 1-3, 2-1, 2-2, 2-3, 3-2, 3-3, 3-4, 4-2, and 4-3 all produced an even resin coating at drawing rates above 500 m/min at the following conditions:

$$F \leq H$$

$$H/4 \leq B \leq 4H$$

$$2° \leq \alpha \leq 8°$$

Of these resin coating devices, each of them except Nos. 2-1, 2-2, and 3-2 yielded even resin coatings without air bubble mixture problems at drawing rates over 800 m/min under the further conditions of:

$$C \geq 5G$$

$$D \geq G$$

$$2° \leq \alpha \leq 5°$$

Finally, devices Nos. 1-1 and 4-2 satisfied the conditions of $$H/4 \leq B \leq 2H$$

$$2° \leq \alpha \leq 4°$$

and produced an even and bubble-free resin coating at drawing rates over 1000 m/min.

Figure 5:
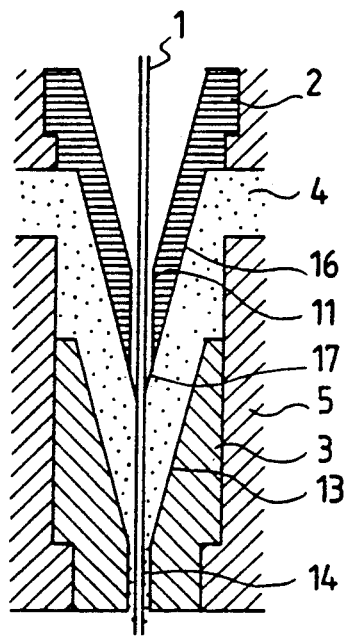
FIG. 5 (Prior Art) is a sectional view of a conventional resin coating device.
Figure 6A:
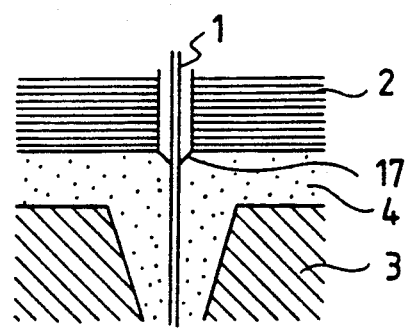
FIGS. 6 and 7 are sectional views of a resin coating device and are used to explain the operation of the present invention.
Figure 6B:
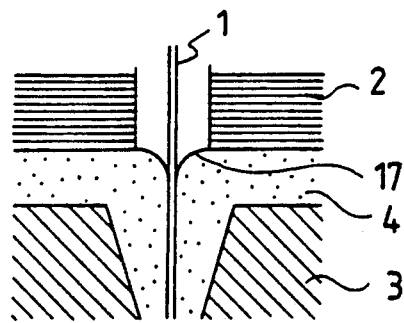
Figure 7:
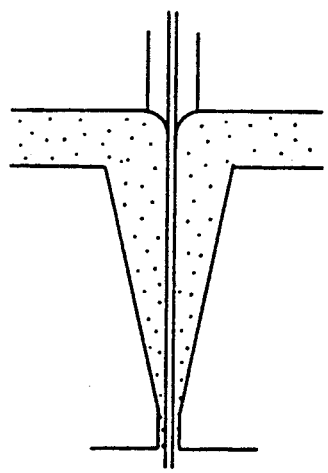
Figure 6C:
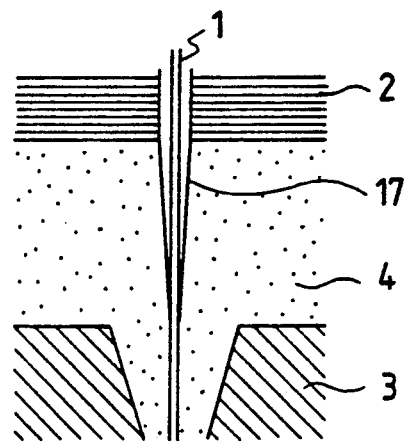

Resin coating devices Nos. 1-4, 1-5, 3-1, 4-1, and 4-4 all produced either resin coatings which were uneven or included air bubbles at drawing rates over 500 m/min. For comparison purposes, resin coating device No. 1-5 was a conventional coating device having the general configuration as explained in FIG. 5.

Figure 3:
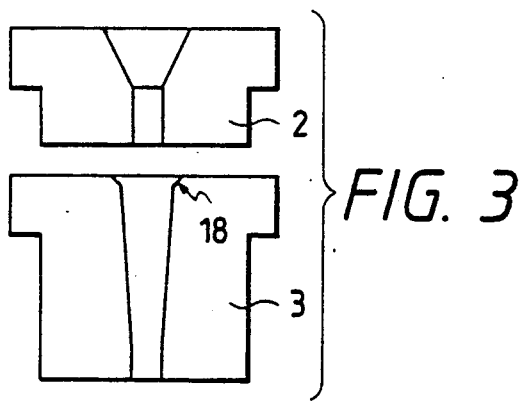
FIG. 3 is another embodiment of the resin coating device according to the present invention.

Another preferred embodiment of the present device is shown in FIG. 3. In order to further enhance the smooth flow of the resin, the edges of the upper surface of the die were removed near the inlet hole. This surface 18 may be slanted, as shown in FIG. 3, or curved to satisfy this preferred embodiment of the present invention.

TABLE I

| No. | A | B | C | D | E | F | G | H | α | Comments |
|-----|-----|-----|-----|-----|-----|------|------|------|-----|---------|
| 1-1 | 5.0 | 0.8 | 4.0 | 1.0 | 14 | 0.30 | 0.24 | 0.45 | 3 | Θ |
| 1-2 | 5.0 | 0.8 | 4.0 | 1.0 | 14 | 0.30 | 0.24 | 0.59 | 5 | β |
| 1-3 | 5.0 | 0.8 | 4.0 | 1.0 | 14 | 0.30 | 0.24 | 0.80 | 8 | ¶, Φ |
| 1-4 | 5.0 | 0.8 | 4.0 | 1.0 | 14 | 0.30 | 0.24 | 0.44 | 10 | Σ, Φ |
| 1-5 | 5.0 | 0.8 | 4.0 | 1.0 | 14 | 0.30 | 0.24 | 4.86 | 60 | Σ, Φ, Ω |
| 2-1 | 4.0 | 0.8 | 4.0 | 0 | 14 | 0.30 | 0.24 | 0.59 | 5 | ¶, Φ |
| 2-2 | 4.2 | 0.8 | 4.0 | 0.2 | 14 | 0.30 | 0.24 | 0.59 | 5 | ¶, Φ |
| 2-3 | 4.5 | 0.8 | 4.0 | 0.5 | 14 | 0.30 | 0.24 | 0.59 | 5 | β |
| 3-1 | 1.4 | 0.8 | 0.4 | 1.0 | 14 | 0.30 | 0.24 | 0.29 | 5 | Σ, Φ |
| 3-2 | 1.8 | 0.8 | 0.8 | 1.0 | 14 | 0.30 | 0.24 | 0.31 | 5 | ¶, Φ |
| 3-3 | 2.2 | 0.8 | 1.2 | 1.0 | 14 | 0.30 | 0.24 | 0.34 | 5 | β |
| 3-4 | 3.0 | 0.8 | 2.0 | 1.0 | 14 | 0.30 | 0.24 | 0.41 | 5 | β |
| 4-1 | 5.0 | 0.1 | 4.0 | 1.0 | 14 | 0.30 | 0.24 | 0.45 | 3 | Σ, Φ |
| 4-2 | 5.0 | 0.4 | 4.0 | 1.0 | 14 | 0.30 | 0.24 | 0.45 | 3 | Θ |
| 4-3 | 5.0 | 1.5 | 4.0 | 1.0 | 14 | 0.30 | 0.24 | 0.45 | 3 | β |
| 4-4 | 5.0 | 2.5 | 4.0 | 1.0 | 14 | 0.30 | 0.24 | 0.45 | 3 | Σ, Ω |

We claim:

1. An optical fiber resin coating device, comprising: a nipple having a center hole, a flat first surface of the nipple being positioned at a nipple outlet portion and being perpendicular to an optical fiber which is drawn through the center hole of the nipple; and a die having a tapered center hole through which the optical fiber is also drawn and a die inlet portion larger in diameter than the nipple outlet portion, the tapered center hole of the die having a taper angle between 2° and 8°, and a first surface of the die being flat and positioned adjacent and parallel to the flat first surface of the nipple such that a gap measuring between one-quarter and four times the diameter of the die inlet portion is created through which a resin is supplied by pressuring and squeezed at the tapered center hole of the die to be coated on the optical fiber as it is drawn through the tapered center hole of the die.

2. An optical fiber resin coating device according to claim 1, wherein the length of the tapered center hole of the die is longer than five times the diameter of the die outlet portion.

3. An optical fiber resin coating device according to claim 1, wherein the diameter of the die outlet portion is constant for a length not lees than the diameter of the die outlet portion.

4. An optical fiber resin coating device according to claim 2, wherein the diameter of the die outlet portion is constant for a length not less than the diameter of the die outlet portion.

* * * * *